Patented Oct. 6, 1953

2,654,727

UNITED STATES PATENT OFFICE 2,654,727

ESTERS OF THIOPHENE-MODIFIED MALEIC ANHYDRIDE-STYRENE COPOLYMERS

Ferdinand P. Otto and Orland M. Reiff, Woodbury, N. J., assignors to Socony-Vacuum Oil Company, Incorporated, a corporation of New York No Drawing. Original application September 29, 1949, Serial No. 118,708. Divided and this application June 27, 1951, Serial No. 233,938

10 Claims. (Cl. 260—78.5)

This invention relates generally to improved lubricating oil compositions. More particularly, it relates to lubricating oil compositions containing esters of thiophene-modified, maleic anhydride-styrene copolymers as pour point depressants and viscosity index improvers.

In a copending application, Serial No. 736,106, filed March 20, 1947, now Patent No. 2,570,846, patented October 9, 1951, by the present inventors and Robert W. Barrett, lubricating oil compositions containing copolymers of styrene and maleic anhydride, esterified with aliphatic alcohols having from about 10 to about 18 carbon atoms as V. I. improvers and pour point depressants are disclosed and claimed.

As is well known, mineral lubricating oils tend to decompose, especially under heat and oxidizing conditions, such as those encountered in use in internal combustion engines. The decomposition products formed in the oil are acidic in nature and exert a corrosive action upon the metal surfaces being lubricated.

We have now found that when styrene is copolymerized with maleic anhydride in the presence of thiophene, or alkyl thiophenes, thiophene-type sulfur is introduced into the copolymer molecule. We have found further that the sulfur-containing polymer products may then be esterified with primary, normal, saturated alcohols having from about 10 to about 18 carbon atoms, to provide products, which are not only effective viscosity index improvers and pour point depressants for lubricating oils, but which are also effective antioxidants for lubricating oils. Thus, these ester products inhibit the tendency of such oils to decompose in use and thereby retard the normal corrosive effects exerted by the oil on the metal surfaces being lubricated.

It is the primary object of this invention to provide improved lubricating oil compositions containing the thiophene-modified, styrene-maleic anhydride esters herein contemplated. Other objects will become apparent from what follows.

As far as is known, the esterified thiophene-modified styrene-maleic anhydride copolymers have not been known heretofore, and they are, therefore, contemplated herein as new compositions of matter.

The thiophene compounds suitable for use in preparing the polymer products of the invention may be represented by the general formula

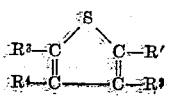

where $R^1$, $R^2$, $R^3$, and $R^4$ represent hydrogen or alkyl groups, which may be straight, branch-chained or cycloaliphatic in structure. As typical examples of suitable thiophene compounds, there may be mentioned thiophene per se, 2-methyl thiophene, 3-methyl thiophene, 2-tertiary-butyl thiophene, 2,5-di-tertiary-butyl thiophene, 2,3,5-trimethyl thiophene, 2,3,4,5-tetra-methyl thiophene, 2,5-dimethyl, 3,4-diethyl thiophene, 2-cyclohexyl thiophene, 2-dodecyl thiophene, 2-octadecyl thiophene, 2-wax thiophene and 2,5-di-wax thiophene.

The esterified thiophene-modified copolymer products of the invention are prepared by, first, reacting together maleic anhydride and styrene in the presence of the thiophene derivative to form the thiophene-modified, maleic anhydride-styrene copolymer and then esterifying the product with the alcohol.

Substantially equimolar quantities of maleic anhydride and styrene are employed in the copolymerization reaction, the thiophene compound being present in at least about equimolar amount, and preferably in excess, the preferred amount being from about 4 to about 10 moles per mole of maleic anhydride or styrene, since these latter amounts provide products having the largest percentages of thiophene incorporated therein.

The reaction may also be carried out with the aid of benzene, xylene, dioxane or the like as solvent materials where desirable.

Suitable reaction temperatures range from about 75° C. to about 125° C., the normal practice being to utilize a temperature sufficient to maintain the reaction mixture at gentle reflux. The time of reaction varies between about 1 and about 10 hours, however, the reaction is generally completed in from about 2 to about 7 hours.

We have found that a catalyst is unnecessary, although the reaction is facilitated by the use of a small amount, from about 1 to 5 weight per cent, based on the amount of maleic anhydride used, of an organic peroxide catalyst, such as benzoyl peroxide.

The thiophene-modified copolymer product is esterified with a primary, normal, saturated, aliphatic alcohol to produce the esterified copolymers of the invention. The esterification reaction is effected under ordinary esterification conditions, i. e. by heating the copolymer and the alcohol in the presence of strong sulfuric acid.

The saturated, normal alcohols suitable for providing the products herein contemplated are those having from about 10 to about 18 carbon atoms. Any of these alcohols will yield ester products which are effective as V. I. improvers in mineral oils. However, only those relatively pure alcohols having from 14 to 16 carbon atoms, or a mixture of alcohols having an average of about 14 carbon atoms, will provide products which are effective as pour point depressants.

Specifically, the alcohols which we may use are decyl, undecyl, dodecyl, tridecyl, tetradecyl, pentadecyl, hexadecyl, heptadecyl and octadecyl alcohols. A preferred alcohol reactant, however, is "Lorol-B." This is a mixture of alcohols marketed by E. I. du Pont de Nemours & Company, which contains saturated, straight-chain alcohols in the following approximate proportions: 2.5% of C-10 alcohols, 55.0% of C-12 alcohols, 20.5% of C-14 alcohols, 9.0% of C-16 alcohols and 13.0% of C-18 alcohols; the average chain length of the alcohols being 13.5 carbon atoms per molecule.

A more complete understanding of the invention will be had from the following examples illustrating detailed procedures which may be conveniently followed in preparing our new reaction products.

EXAMPLE I

*Thiophene-modified styrene-maleic anhydride copolymer*

REACTION MIXTURE

| | Grams |
|---|---|
| Maleic anhydride | 24.5 |
| Styrene | 25.5 |
| Thiophene | 200.0 |
| Benzoyl peroxide | 1.0 |

These reactants were placed in a ½ liter stainless steel stirring-type autoclave. The autoclave temperature was maintained at 121° C. for a period of 6½ hours. The product, a brittle, thiophene-insoluble material, was then isolated by filtration and dissolved in acetone. By pouring this solution into methanol, filtering and drying the precipitate, there was obtained 37 grams of a pale brown, amorphous powder containing 2.1% sulfur.

EXAMPLE II

*2-methylthiophene-modified styrene-maleic anhydride copolymer*

REACTION MIXTURE

| | | |
|---|---|---|
| Maleic anhydride | grams | 49 |
| Styrene | do | 40 |
| 2-methylthiophene | cc | 500 |
| Benzoyl peroxide | gram | 1.0 |

These reactants were placed in a 3-neck, round-bottom flask equipped with a reflux condenser, thermometer and mechanically driven stirrer. The mixture was then refluxed for a period of 5 hours at 116° C. The product, an amorphous, pale brown, insoluble material, was isolated from the solvent layer by decantation, and then dissolved in acetone. By pouring this solution into methanol, filtering and drying the precipitate, there was obtained 53 grams of a pale brown, amorphous powder containing 3.3% sulfur. A saponification value of 537 indicated that the product contains 47% by weight of maleic anhydride.

EXAMPLE III

*3-methylthiophene-modified styrene-maleic anhydride copolymer*

REACTION MIXTURE

| | | |
|---|---|---|
| Maleic anhydride | grams | 49 |
| Styrene | do | 50 |
| 3-methylthiophene | cc | 500 |
| Benzoyl peroxide | gram | 1.0 |

These reactants were placed in a 3-neck, round-bottom flask equipped with a reflux condenser, thermometer and mechanically driven stirrer. The mixture was then heated for a period of 5 hours at 119° C. The product, an amorphous, pale brown, insoluble material, was isolated from the solvent layer by decantation and then dissolved in acetone. By pouring this solution into methanol, filtering and drying the precipitate, there was obtained 84 grams of a pale brown, amorphous powder containing 4.8% sulfur. A saponification value of 519 indicated that the product contains 45.3% by weight maleic anhydride.

EXAMPLE IV

*2-t-butylthiophene-modified styrene-maleic anhydride copolymer*

REACTION MIXTURE

| | | |
|---|---|---|
| Maleic anhydride | grams | 49 |
| Styrene | do | 52 |
| 2-t-butylthiophene | cc | 250 |
| Benzoyl peroxide | gram | 1.0 |

These reactants were placed in a 3-neck, round-bottom flask equipped with a reflux condenser, thermometer and mechanically driven stirrer. The mixture was then heated for a period of 2 hours at 80-90° C. The product, a brittle, insoluble material, was then isolated by filtration and dissolved in acetone. By pouring this solution into methanol, filtering and drying the precipitate, there was obtained 79.5 grams of a pale brown, amorphous powder containing 2.1% sulfur. A saponification value of 531 indicated that the product contains 46.5% by weight maleic anhydride.

EXAMPLE V

*2,5-di-t-butylthiophene-modified styrene-maleic anhydride copolymer*

REACTION MIXTURE

| | | |
|---|---|---|
| Maleic anhydride | grams | 49 |
| Styrene | do | 52 |
| Benzoyl peroxide | gram | 1.0 |
| 2,5-di-t-butylthiophene | cc | 250 |

These reactants were placed in a 3-neck, round-bottom flask equipped with a reflux condenser, thermometer and mechanically driven stirrer. The mixture was then heated to 80° C. and as the result of a violently exothermic reaction the temperature rose to 180° C. The product, a brittle insoluble material, was then isolated by decantation and dissolved in acetone. By pouring this solution into methanol, filtering and drying the precipitate, there was obtained 82 grams of a pale brown, amorphous powder containing 1.66% sulfur. A saponification value of 495 indicated that the product contains 43.2% by weight of maleic anhydride.

EXAMPLE VI

*3-methylthiophene-modified styrene-maleic anhydride copolymer (xylene solvent and a mol. equivalent of 3-methylthiophene*

REACTION MIXTURE

| | |
|---|---|
| Maleic anhydride | 49 grams (½ mole). |
| Styrene | 52 grams (½ mole). |
| 3-methylthiophene | 49 grams (½ mole). |
| Benzoyl peroxide | 1.0 gram. |
| Xylene | 600 cc. |

The reactants were placed in a 3-neck, round-bottom flask equipped with a reflux condenser, thermometer and mechanically driven stirrer. The mixture was then heated to 125° C. and as a result of an exothermic reaction, the temperature rose to 140° C. After cooling to 115° C. the mixture was maintained at this temperature for one hour. The product, an almost white, xylene-insoluble, amorphous solid, was filtered from the reaction solvent by means of a Buchner funnel. Further purification was accomplished by dissolving the polymer in acetone (300 cc.) and pouring this solution into methanol (1500 cc.). The precipitated product, after separation and drying, was a white, amorphous powder weighing 79 grams and containing 0.79% sulfur.

EXAMPLE VII

*Styrene-maleic anhydride copolymer (xylene solvent)*

REACTION MIXTURE

| | |
|---|---|
| Maleic anhydride _____grams__ | 49 |
| Styrene _____do____ | 52 |
| Xylene _____cc___ | 600 |
| Benzoyl peroxide _____gram__ | 1.0 |

The reactants were placed in a 3-neck, round-bottom flask equipped with a reflux condenser, a thermometer and a mechanically driven stirrer. The mixture was then heated for a period of one hour at 110–120° C. The product, a white, amorphous solid, was isolated by filtration and washed with xylene and methanol. After oven drying, the polymer weighed 100 grams.

EXAMPLE VIII

*Di "Lorol-B" ester of the thiophene-modified styrene-maleic anhydride copolymer of Example I*

REACTION MIXTURE

| | |
|---|---|
| Thiophene-modified styrene-maleic anhydride copolymer (Ex. I) _____grams__ | 15.0 |
| "Lorol-B" _____do____ | 40.0 |
| Xylene _____cc___ | 200 |
| Sulfuric acid (98%) _____cc___ | 0.3 |

The reaction mixture was placed in a one-liter, three-neck flask equipped with a thermometer, mechanical stirrer and condenser. Between the condenser and flask was placed a Dean and Stark moisture trap fitted with a stopcock for removing water and solvent when so desired. A short while after the mixture had been heated at the reflux temperature of 140–150° C., the suspended copolymer gradually reacted to form the half ester. The homogeneous solution thus obtained was then maintained at this temperature for about 3 hours, during which time the water of reaction slowly distilled over into the moisture trap, with the aid of the refluxing xylene solvent. The xylene was then permitted to distill off until the temperature of the reaction mixture had reached 160° C. After remaining for about 15 minutes at this temperature, the product was permitted to cool to room temperature. The viscous composition was then diluted with 100 cc. of benzol and stirred with about 10 grams of sodium bicarbonate to neutralize the acidic catalyst. After filtration through "Hi-Flo" clay, the filtrate was topped to 300° C. at 5 mm. pressure to remove solvents and unreacted Lorol alcohol. The product, a light brown, tacky material, had a neutralization number of 6.0, indicating that essentially complete esterification of the copolymer had taken place. The sulfur content of the finished product was 0.82%.

The product of Example VIII was free of mineral oil in the finished form. Some of the products in the following examples were blended with mineral oil to the extent of 75%, to lower the viscosity of the additive and thus facilitate further blending operations. All concentrations of the various esters evaluated are, however, reported on the basis of mineral oil-free products.

EXAMPLE IX

*Di "Lorol-B" ester of the 2-methylthiophene-modified styrene-maleic anhydride copolymer of Example II*

REACTION MIXTURE

| | |
|---|---|
| 2-methylthiophene-modified styrene-maleic anhydride copolymer (Example II) _____ | |
| | grams__ 15.0 |
| "Lorol-B" _____do____ | 37.5 |
| Xylene _____cc___ | 200 |
| Sulfuric acid (98%) _____cc___ | 0.3 |

The same general procedure was followed as outlined in Example VIII.

EXAMPLE X

*Di "Lorol-B" ester of the 3-methylthiophene-modified styrene-maleic anhydride copolymer of Example III*

REACTION MIXTURE

| | |
|---|---|
| 3-methylthiophene-modified styrene-maleic anhydride copolymer (Example III) _____ | |
| | grams__ 15.0 |
| "Lorol-B" _____do____ | 37.5 |
| Xylene _____cc___ | 200 |
| Sulfuric acid (98%) _____cc___ | 0.3 |

The same general procedure was followed as outlined in Example VIII.

EXAMPLE XI

*Di "Lorol-B" ester of the 2-t-butylthiophene-modified styrene-maleic anhydride copolymer of Example IV*

REACTION MIXTURE

| | |
|---|---|
| 2-t-butylthiophene-modified styrene-maleic anhydride copolymer (Example IV) _____ | |
| | grams__ 15.0 |
| "Lorol-B" _____do____ | 37.5 |
| Xylene _____cc___ | 100 |
| Sulfuric acid (98%) _____cc___ | 0.3 |

The same general procedure was followed as outlined in Example VIII.

EXAMPLE XII

*Di "Lorol-B" ester of the 2,5-t-butylthiophene-modified styrene-maleic anhydride copolymer of Example V*

REACTION MIXTURE

| | |
|---|---|
| 2,5-di-t-butylthiophene-modified styrene-maleic anhydride copolymer (Example V) | |
| | grams__ 15.0 |
| "Lorol-B" _____do____ | 37.5 |
| Xylene _____cc___ | 100 |
| Sulfuric acid (98%) _____cc___ | 0.3 |

The same general procedure was followed as outlined in Example VIII.

EXAMPLE XIII

*Di "Lorol-B" ester of the 3-methylthiophene-modified styrene-maleic anhydride copolymer of Example VI*

REACTION MIXTURE

| | |
|---|---|
| 3-methylthiophene-modified styrene-maleic anhydride copolymer (Example VI) _____ | |
| | grams__ 15.0 |
| "Lorol-B" _____do____ | 37.5 |
| Xylene _____cc___ | 200 |
| Sulfuric acid (98%) _____cc___ | 0.3 |

The same general procedure was followed as outlined in Example VIII.

EXAMPLE XIV

Di "Lorol-B" ester of the styrene-maleic anhydride copolymer of Example VII

REACTION MIXTURE

| | |
|---|---|
| Styrene-maleic anhydride copolymer (Example VII) grams | 15.0 |
| "Lorol-B" do | 37.5 |
| Xylene cc | 200 |
| Sulfuric acid (98%) cc | 0.3 |

The same general procedure was followed as outlined in Example VIII.

EXAMPLE XV-A

Di-decyl ester of the 3-methylthiophene-modified styrene-maleic anhydride copolymer of Example VI

REACTION MIXTURE

| | |
|---|---|
| 3-methylthiophene-modified styrene-maleic anhydride copolymer (Example VI) grams | 15.0 |
| 1-decanol do | 29.0 |
| Xylene cc | 200 |
| Sulfuric acid (98%) cc | 0.3 |

EXAMPLE XV-B

Didodecyl ester of the 3-methylthiophene-modified styrene-maleic anhydride copolymer of Example VI

REACTION MIXTURE

| | |
|---|---|
| 3-methylthiophene-modified styrene-maleic anhydride copolymer (Example VI) grams | 15.0 |
| 1-dodecanol do | 33.0 |
| Xylene cc | 200 |
| Sulfuric acid (98%) cc | 0.5 |

EXAMPLE XV-C

Di-tetradecyl ester of the 3-methylthiophene-modified styrene-maleic anhydride copolymer of Example VI

REACTION MIXTURE

| | |
|---|---|
| 3-methylthiophene-modified styrene-maleic anhydride copolymer (Example VI) grams | 15.0 |
| 1-tetradecanol do | 37.5 |
| Xylene cc | 200 |
| Sulfuric acid (98%) cc | 0.3 |

EXAMPLE XV-D

Di-hexadecyl ester of the 3-methylthiophene-modified styrene-maleic anhydride copolymer of Example VI

REACTION MIXTURE

| | |
|---|---|
| 3-methylthiophene-modified styrene-maleic anhydride copolymer (Example VI) grams | 15.0 |
| 1-hexadecanol do | 45.0 |
| Xylene cc | 200 |
| Sulfuric acid (98%) cc | 0.5 |

EXAMPLE XV-E

Di-octadecyl ester of the 3-methylthiophene-modified styrene-maleic anhydride copolymer of Example VI

REACTION MIXTURE

| | |
|---|---|
| 3-methylthiophene-modified styrene-maleic anhydride copolymer (Example VI) grams | 15.0 |
| 1-octadecanol do | 46.0 |
| Xylene cc | 200 |
| Sulfuric acid (98%) cc | 1.0 |

The same general procedure was followed for these products as outlined in Example VIII.

*Pour point depression and V. I. improvement*

To demonstrate the effectiveness of the various products in reducing the pour point and increasing the viscosity index of lubricating oils, the results obtained in tests conducted on blends of the various products in various proportions in lubricating oils are presented in Tables I and II.

Two different base oils were used in these tests, Oil A being a solvent-refined Mid-Continent, SAE 30 grade oil having a kinematic viscosity at 210° F. of 11.96 and a 20° F. pour point, and Oil B being an acid-refined, Mid-Continent stock with a kinematic viscosity at 100° F. of 30.49, a kinematic viscosity at 210° F. of 4.83 and a viscosity index of 80.1.

Table I shows the effect of varying the type of thiophene derivative utilized in modifying the styrene-maleic anhydride copolymer, while Table II shows the effect of varying the ester chain length of the 3-methylthiophene-modified copolymer. It will be observed from Table I that the best results were obtained with the copolymers modified with the branched-chain alkyl thiophene derivatives, while Table II shows that only the esters derived from the 14 and 16 carbon atom alcohols to be effective as pour point depressants, although good viscosity index improvement is effected by the esters of any of the alcohols having from 10 carbon atoms up to 18 carbon atoms.

TABLE I

| Ex. No. | Thiophene Compound | Type Ester | ASTM Pour Point in Oil A | | | V. I. of 1% Blend in Oil B | | V. I. |
|---|---|---|---|---|---|---|---|---|
| | | | ¼% | ⅛% | ¹⁄₁₆% | Kin. Vis. @100° F. | Kin. Vis. @210° F. | |
| VIII | Thiophene | "Lorol-B" | −30 | −20 | +15 | 31.94 | 5.01 | 85.6 |
| IX | 2-Methylthiophene | do | −30 | −25 | −10 | 32.97 | 5.18 | 92.8 |
| X | 3-Methylthiophene | do | −20 | −15 | +5 | 32.42 | 5.09 | 89.2 |
| XI | 2-t-Butylthiophene | do | −30 | −30 | −25 | 35.69 | 5.60 | 104.4 |
| XII | 2,5-di-t-Butylthiophene | do | −30 | −30 | −25 | 39.52 | 6.23 | 114.8 |
| XIII | 3-Methylthiopene (Molecular Equivalent+Xylene) | do | | −30 | −25 | 33.34 | 5.25 | 95.5 |

TABLE II

| Ex. No. | Thiophene Compound | Type Ester | ASTM Pour Point in Oil A | | | | V. I. of 1% Blend in Oil B | | V. I. |
|---|---|---|---|---|---|---|---|---|---|
| | | | 1% | ¼% | ⅛% | ¹⁄₁₆% | Kin. Vis. @100° F. | Kin. Vis. @210° F. | |
| XV-A | 3-Methylthiophene | 1-Decanol | +20 | | | | 32.77 | 5.13 | 90.1 |
| XV-B | do | 1-Dodecanol | +20 | | | | 30.07 | 5.16 | 90.3 |
| XV-C | do | 1-Tetradecanol | | −35 | −25 | −10 | 32.28 | 5.07 | 88.5 |
| XV-D | do | 1-Hexadecanol | | −20 | −10 | | 32.23 | 5.04 | 86.2 |
| XV-E | do | 1-Octadecanol | +25 | | | | 32.69 | 5.09 | 87.2 |

Corrosion inhibition

As mentioned hereinbefore, an added advantage of our new thiophene-modified products is their ability to prevent corrosion of metal surfaces. To demonstrate this ability several of the products were tested in the Socony-Vacuum Bubble Test. In this test a connecting rod bearing having a Cd-Ag alloy surface is carefully weighed and placed in a 200 x 25 mm. test tube together with 30 grams of the test oil. The test tube is placed in a constant temperature bath and air blown through the test oil at the rate of 2 liters per hour for the required time (22 hours) at a temperature of 175° C. The test piece is then removed and weighed for loss in weight. The results are reported in mgms. of weight loss. The results obtained in several such tests, conducted on blends of the various products in a solvent-refined oil having a kinematic viscosity of 8.2 at 210° F., are given in Table III. As can be observed from the data, the product of Example XIV, which was not modified with a thiophene compound, does not prevent bearing corrosion, whereas the thiophene-modified products provide substantial corrosion inhibition.

TABLE III

| Product of Example No. | Product | Bearing Wt. Loss (mgs.) in Bubble Test (CD-AG Bearing), Concentration of Additive | | | | |
|---|---|---|---|---|---|---|
| | | 2% | 1% | ½% | ¼% | Blank Oil |
| VIII | Di "Lorol-B" Ester of the Thiophene Modified Styrene-Maleic Anhydride Copolymer. | | | 14 | 5 | 20 |
| X | Di "Lorol-B" Ester of the 3-Methylthiophene Modified Styrene-Maleic Anhydride Copolymer. | 0 | 1 | | | 20 |
| XI | Di "Lorol-B" Ester of the 1-t-Butylthiophene Modified Styrene-Maleic Anhydride Copolymer. | 4 | 6 | | | 24 |
| XIV | Di "Lorol-B" Ester of the Styrene-Maleic Anhydride Copolymer. | 24 | 34 | | | 18 |

Although, as demonstrated herein, oils containing ¹⁄₁₆% of the products of the invention are markedly improved, significant improvement will be obtained by the use of as little as .01%. Furthermore, although amounts up to about 1% are generally sufficient, in certain applications as much as 10% of the additive compounds are used. Also, it is contemplated that the products of the invention be incorporated in greater concentration, i. e. above 10%, to provide "concentrates" of these materials in oil for marketing, such concentrated compositions affording a readily soluble form of the additive materials for dilution with further quantities of oil prior to actual use.

The oils in which our new addition agents are incorporated, or the oil "concentrates," may also contain other addition agents, designed to improve the character of the oil in other respects, such as extreme pressure quality, detergency, etc.

Although the principles of the invention have been illustrated herein by means of certain specific examples and tests, it is not intended that the scope of the invention be limited thereby, but only as indicated in the appended claims.

This application is a division of application Serial No. 118,708, filed September 29, 1949, now Patent No. 2,600,798, issued June 17, 1952.

We claim:

1. As a new composition of matter, a reaction product prepared by the steps of (1) reacting together (a) about 1 mole of maleic anhydride, (b) about 1 mole of styrene and (c) from about 1 to about 10 moles of a thiophene compound selected from the group consisting of thiophene and alkyl-substituted thiophenes containing no substituent groups other than alkyl groups, at a temperature of from about 75° C. to about 125° C., and (2) esterifying the product obtained in step (1) with a primary, normal, saturated alcohol having from about 10 to about 18 carbon atoms.

2. As a new composition of matter, a reaction product prepared by the steps of (1) reacting together (a) about 1 mole of maleic anhydride, (b) about 1 mole of styrene and (c) from about 1 to about 10 moles of a thiophene compound selected from the group consisting of thiophene and alkyl-substituted thiophenes containing no substituent groups other than alkyl groups, at a temperature of from about 75° C. to about 125° C., and (2) esterifying the product thus obtained with a mixture of primary, normal, saturated alcohols having an average of about 14 carbon atoms per molecule.

3. As a new composition of matter, a reaction product prepared by the steps of (1) reacting together (a) about 1 mole of maleic anhydride, (b) about 1 mole of styrene and (c) from about 1 to about 10 moles of 2-tertiary-butyl thiophene and (2) esterifying the product obtained in step (1) with a primary, normal, saturated alcohol having from about 10 to about 18 carbon atoms.

4. As a new composition of matter, a reaction product prepared by the steps of (1) reacting together (a) about 1 mole of maleic anhydride, (b) about 1 mole of styrene and (c) from about 1 to about 10 moles of 2-tertiary-butyl thiophene and (2) esterifying the product obtained in step (1) with a mixture of primary, normal, saturated alcohols having an average of about 14 carbon atoms per molecule.

5. As a new composition of matter, a reaction product prepared by the steps of (1) reacting together (a) about 1 mole of maleic anhydride, (b) about 1 mole of styrene and (c) from about 1 to about 10 moles of 2-methyl thiophene and (2) esterifying the product obtained in step (1) with a primary, normal, saturated alcohol having from about 10 to about 18 carbon atoms.

6. As a new composition of matter, a reaction product prepared by the steps of (1) reacting together (a) about 1 mole of maleic anhydride, (b) about 1 mole of styrene and (c) from about 1 to about 10 moles of 2-methyl thiophene and (2) esterifying the product obtained in step (1) with a mixture of primary, normal, saturated alcohols having an average of about 14 carbon atoms per molecule.

7. As a new composition of matter, a reaction product prepared by the steps of (1) reacting together (a) about 1 mole of maleic anhydride, (b) about 1 mole of styrene and (c) from about 1 to about 10 moles of a thiophene compound selected from the group consisting of thiophene and alkyl-substituted thiophenes containing no substituent groups other than alkyl groups, at a temperature of from about 75° C. to about 125° C., and (2) esterifying the product thus obtained with a primary, normal, saturated alcohol having from 14 to 16 carbon atoms.

8. As a new composition of matter, a reaction product prepared by the steps of (1) reacting together (a) about 1 mole of maleic anhydride, (b) about 1 mole of styrene and (c) from about 1 to about 10 moles of thiophene and (2) esterifying the product obtained in step (1) with a mixture of primary, normal, saturated alcohols having an average of about 14 carbon atoms per molecule.

9. As a new composition of matter, a reaction product prepared by the steps of (1) reacting together (a) about 1 mole of maleic anhydride, (b) about 1 mole of styrene and (c) from about 1 to about 10 moles of 2,5-di-tertiary-butyl thiophene and (2) esterifying the product obtained in step (1) with a mixture of primary, normal, saturated alcohols having an average of about 14 carbon atoms per molecule.

10. As a new composition of matter, a reaction product prepared by the steps of (1) reacting together (a) about 1 mole of maleic anhydride, (b) about 1 mole of styrene and (c) from about 1 to about 10 moles of 3-methyl thiophene and (2) esterifying the product obtained in step (1) with tetradecyl alcohol.

FERDINAND P. OTTO.
ORLAND M. REIFF.

No references cited.